US012762788B2

(12) United States Patent
Kuriyama

(10) Patent No.: US 12,762,788 B2
(45) Date of Patent: Oct. 13, 2026

(54) TIME SERIES INFORMATION DISPLAY DEVICE AND TIME SERIES INFORMATION DISPLAY METHOD

(71) Applicant: RC Solution Co., Tokyo (JP)

(72) Inventor: Akira Kuriyama, Tokyo (JP)

(73) Assignee: RC Solution Co., Tokyo (JP)

( * ) Notice: Subject to any disclaimer, the term of this patent is extended or adjusted under 35 U.S.C. 154(b) by 207 days.

(21) Appl. No.: 18/714,997

(22) PCT Filed: Nov. 28, 2022

(86) PCT No.: PCT/JP2022/043699
§ 371 (c)(1),
(2) Date: May 30, 2024

(87) PCT Pub. No.: WO2023/112649
PCT Pub. Date: Jun. 22, 2023

(65) Prior Publication Data

US 2025/0029320 A1 Jan. 23, 2025

(30) Foreign Application Priority Data

Dec. 16, 2021 (JP) ................................ 2021-204057

(51) Int. Cl.
*G06T 19/00* (2011.01)
*G06T 15/20* (2011.01)
*G06T 19/20* (2011.01)

(52) U.S. Cl.
CPC .......... *G06T 15/205* (2013.01); *G06T 19/006* (2013.01); *G06T 19/20* (2013.01); *G06T 2219/2016* (2013.01)

(58) Field of Classification Search
CPC ..... G06T 15/205; G06T 19/006; G06T 19/20; G06T 2219/2016
See application file for complete search history.

(56) References Cited

U.S. PATENT DOCUMENTS 7,738,320 B2 * 6/2010 Taha ........................ G01D 7/02
368/239
7,904,679 B2 * 3/2011 Stager ................ G06F 11/1448
711/163

(Continued)

*Primary Examiner* — Cheng Yuan Tseng
(74) *Attorney, Agent, or Firm* — Hanley, Flight & Zimmerman, LLC

(57) ABSTRACT

A time axis is taken in a depth direction using perspective. There are provided a space display unit 11 that displays an image of a three-dimensional space 30 generated by assigning a plurality of different types of scales 41 to 43 for sizes of time units and a time series information display unit 12 that displays time series information in units of time corresponding to a time point designated on the time axis. By setting the start position of assigning the scales 41 to 43 on the front side for scales of small time units and setting the start position of assigning the scales 41 to 43 on the back side for scales of large time units, it is possible to avoid a situation in which the intervals between the scales become too small both on the front side and the back side of the time axis, resulting in poor visibility or poor designation operability. In addition, it is easy to intuitively understand which time unit of time series information is displayed when which position on the time axis is designated.

18 Claims, 9 Drawing Sheets

(56) References Cited

U.S. PATENT DOCUMENTS

| | | | | |
|---|---|---|---|---|
| 8,010,900 | B2 * | 8/2011 | Hart | G06F 11/1469 715/769 |
| 8,311,988 | B2 * | 11/2012 | Cisler | G06F 11/1466 707/690 |
| 8,495,024 | B2 * | 7/2013 | Cisler | G06F 9/451 707/654 |
| 9,715,394 | B2 * | 7/2017 | Cisler | G06F 16/168 |
| 9,832,392 | B2 * | 11/2017 | Ayers | H04N 5/2624 |
| 11,314,625 | B2 * | 4/2022 | O'Dowd | G06F 11/3636 |
| 11,743,537 | B2 * | 8/2023 | Kulas | H04N 21/8586 348/46 |
| 2025/0029320 | A1 * | 1/2025 | Kuriyama | G06T 11/26 |

* cited by examiner

TIME SERIES INFORMATION DISPLAY DEVICE AND TIME SERIES INFORMATION DISPLAY METHOD

CROSS-REFERENCE TO RELATED APPLICATION

This Patent arises from a US National Stage of International Application No. PCT/JP2022/043699, filed Nov. 28, 2022, which claims priority to Japanese Patent Application No. 2021-204057, filed on Dec. 16, 2021. Priority to International Application No. PCT/JP2022/043699 and Japanese Patent Application No. 2021-204057 is hereby claimed. International Application No. PCT/JP2022/043699 and Japanese Patent Application No. 2021-204057 are hereby incorporated by reference in their entireties.

TECHNICAL FIELD

The present invention relates to a time series information display device and a time series information display method, and in particular, to a device and a method for displaying time series information according to a user's operation on a time axis expressed using perspective.

BACKGROUND ART

Conventionally, a system is known that provides time series information predicted from the present to the future, such as weather information or natural disaster information (including information on damage caused by natural disasters). Some systems of this type display the time series information along the time-series time axis. For example, there is a widely available system in which, on a display screen having an image of a two-dimensional space, a time axis is set on either the horizontal axis or the vertical axis and time series information is displayed side by side along the time axis or time series information corresponding to the position of a cursor moved along the time axis is pop-up displayed.

However, when displaying the time series information along the horizontal axis or the vertical axis, there are the following problems. That is, when there is time series information on the long time axis, in order to display the entire time axis within one screen, the intervals between the scales are reduced to cause poor visibility. Conversely, when increasing the intervals between the scales to ensure good visibility, it is not possible to display the entire time axis on one screen. For this reason, it is necessary to scroll or switch the screen.

On the other hand, there is also known a system that displays time series information along the time axis expressed using perspective (for example, see PTL 1). In this system described in PTL 1, time series information is displayed on the display screen of a three-dimensional space with the time axis in the depth direction. Such a three-dimensional display is advantageous in that it is possible to provide time series information without interrupting the time axis, compared to a case of displaying time series information by switching based on an operation of scrolling the screen in a two-dimensional display.

Incidentally, time series information that is predicted from the present to the future, such as weather information or natural disaster information, generally has the following characteristics. That is, for predicted information for the near future from the current time, it is possible to provide information with high prediction accuracy in short units of time, whereas for the future far from the current time, it is difficult to make accurate predictions in short units of time. Therefore, the unit time of predicted information that can be provided increases. For example, predicted information in units of five minutes is provided for the near future from the current time, whereas as long time passes from the current time, only predicted information in units of one hour or one day is provided.

PTL 1: WO2016/080066

SUMMARY OF INVENTION

Technical Problem

As the weather information or the natural disaster information, it is desirable to provide information on how far in the future and what kind of situation is predicted in a manner that the user can understand correctly. However, in the system described in PTL 1, information is not provided in a manner that the characteristics of the predicted information described above are taken into consideration. Therefore, an object of the invention is to provide time series information in an easy-to-understand manner while ensuring good visibility without scrolling or switching the screen, when providing time series information with different time units along the long time axis.

Solution to Problem

In order to solve the aforementioned problems, in the invention, a time axis is taken in a depth direction using perspective, an image of a three-dimensional space generated by assigning a plurality of different types of scales for sizes of time units along the time axis is displayed, and time series information in units of time corresponding to a time point designated on the time axis of the three-dimensional space is displayed. Here, a start position of assigning the plurality of different types of scales for sizes of the time units to the time axis is set on a front side in the depth direction of the time axis for scales of small time units and set at a position on a back side in the depth direction of the time axis for scales of large time units.

Advantageous Effects of Invention

According to the invention configured as described above, on the time axis set in the depth direction using perspective, the scales of small time units are assigned from the front side, and the scales of large time units are assigned from the back side. For this reason, it is possible to avoid a situation in which the intervals between the scales become too small both on the front side and the back side of the time axis, resulting in poor visibility or poor designation operability. Therefore, it is possible to provide time series information without scrolling or switching the screen. In addition, according to the invention, a plurality of different types of scales for sizes of time units are assigned along the time axis. Therefore, information can be provided in a state in which it is easy to intuitively understand which time unit of time series information is displayed when which position on the time axis is designated. As described above, according to the invention, when providing time series information with different time units along the long time axis, it is possible to provide the time series information in an easy-to-understand manner while ensuring good visibility without scrolling or switching the screen.

DESCRIPTION OF EMBODIMENTS

Figure 1:
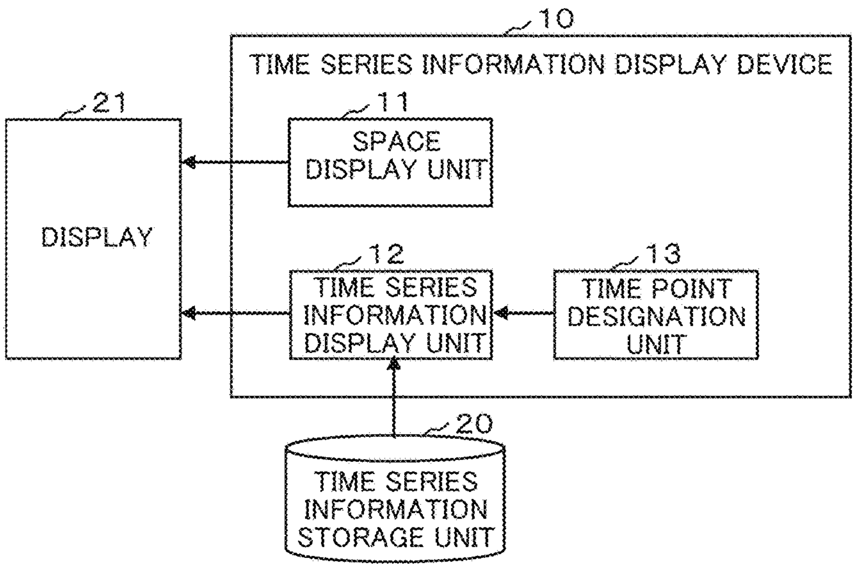
FIG. 1 is a block diagram showing an example of the functional configuration of a time series information display device according to the present embodiment.

Hereinafter, an embodiment of the invention will be described with reference to the diagrams. FIG. 1 is a block diagram showing an example of the functional configuration of a time series information display device 10 according to the present embodiment. As shown in FIG. 1, the time series information display device 10 according to the present embodiment includes, as functional components, a space display unit 11, a time series information display unit 12, and a time point designation unit 13. In addition, a time series information storage unit 20 and a display 21 are connected to the time series information display device 10.

The functional blocks 11 to 13 can be configured by hardware, DSP (Digital Signal Processor), or software. For example, when configured by software, the functional blocks 11 to 13 are actually configured to include a CPU, a RAM, a ROM, and the like of a computer, and are realized by the operation of a program (hereinafter, referred to as a time series information display program) stored in a storage medium, such as a RAM, a ROM, a hard disk, or a semiconductor memory.

The time series information storage unit 20 is a storage medium connected to the time series information display device 10 by wire or wirelessly. The time series information display device 10 and the time series information storage unit 20 may be connected to each other through a communication network such as the Internet or a mobile phone network. For example, the time series information storage unit 20 may be provided in an information providing server on the Internet, and the time series information display device 10 may acquire the time series information from the information providing server. In addition, the time series information display device 10 may have a built-in time series information storage unit 20.

The time series information stored in the time series information storage unit 20 includes time series information with different time units. For example, the time series information is information predicted from the present to the future, such as weather information or natural disaster information, and is information that predicts the future in the n-th time unit $T_n$ (n=1, 2, . . . : n is an integer of 2 or more). Here, the closer the predicted information is to the current time, the shorter the unit time the future situation is predicted. On the other hand, the farther the predicted information is from the current time, the longer the unit time the future situation is predicted.

Figure 2:
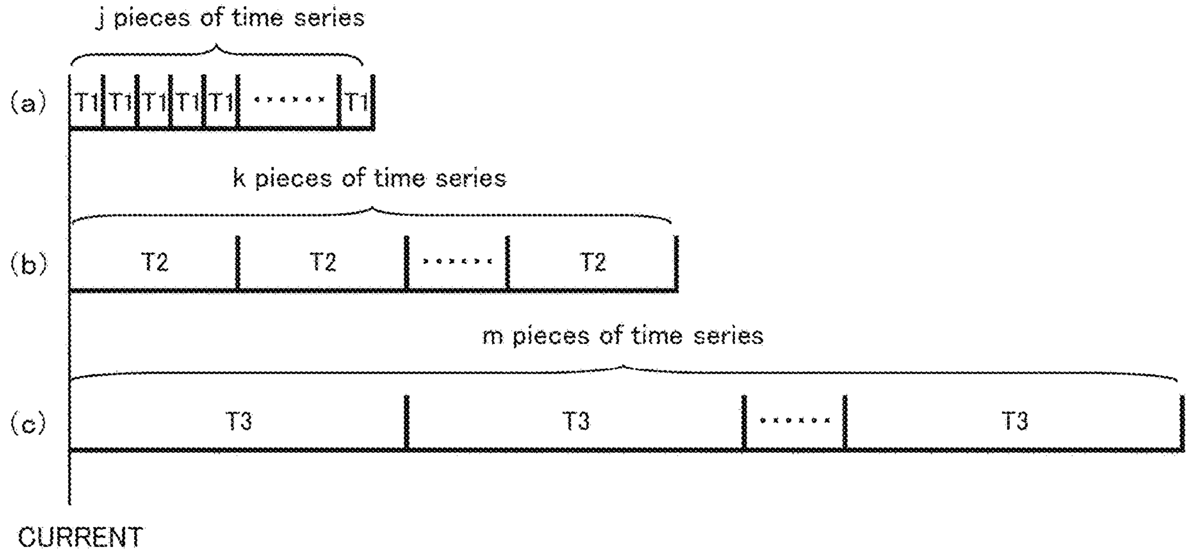
FIG. 2 is a diagram showing an example of time series information.

In the following description of the present embodiment, n=3, and the time unit increases in the order of first time unit T1<second time unit T2<third time unit T3. The time series information storage unit 20 stores j pieces of time series information for the first time unit T1, k pieces of time series information for the second time unit T2, and m pieces of time series information for the third time unit T3 (j, k, and m are all integers of 1 or more). That is, as shown in FIG. 2, predicted information after time [T1×1] from the current time, . . . , predicted information after time [T1×j] from the current time, predicted information after time [T2×1] from the current time, . . . , predicted information after time [T2×k] from the current time, predicted information after time [T3×1] from the current time, . . . , predicted information after time [T3×m] from the current time, are stored in the time series information storage unit 20. Here, for example, assuming that T1=1 and T2=5, the predicted information after time [T1×5] from the current time and the predicted information after time [T2×1] from the current time are the same content.

The time series information in each time unit is updated as the current time passes. For example, the time series information in the first time unit T1 is updated every time the current time passes by the time T1. Even after the update, the number of pieces of time series information in the first time unit T1 remains j. In addition, the content of the time series information in the second time unit T2 is updated every time the current time passes by the time T2. Even after the update, the number of pieces of time series information in the second time unit T2 remains k. Similarly, the content of the time series information in the third time unit T3 is updated every time the current time passes by the time T3. Even after the update, the number of pieces of time series information in the third time unit T3 remains m.

The time series information display device 10 according to the present embodiment displays time series information along the time axis on a display screen, which has an image of a three-dimensional space with the time axis in the depth direction using perspective, using the functions of the space display unit 11, the time series information display unit 12, and the time point designation unit 13. Hereinafter, the functions of the space display unit 11, the time series information display unit 12, and the time point designation unit 13 will be described in detail.

The space display unit 11 displays, on the display 21, an image of a three-dimensional space generated by assigning a plurality of different types of scales for sizes of time units along the time axis. Here, the space display unit 11 sets the start position of assigning a plurality of different types of scales for sizes of time units to the time axis on the front side in the depth direction of the time axis for the scales of small time units and at a position on the back side in the depth direction of the time axis for the scales of large time units.

Figure 3:
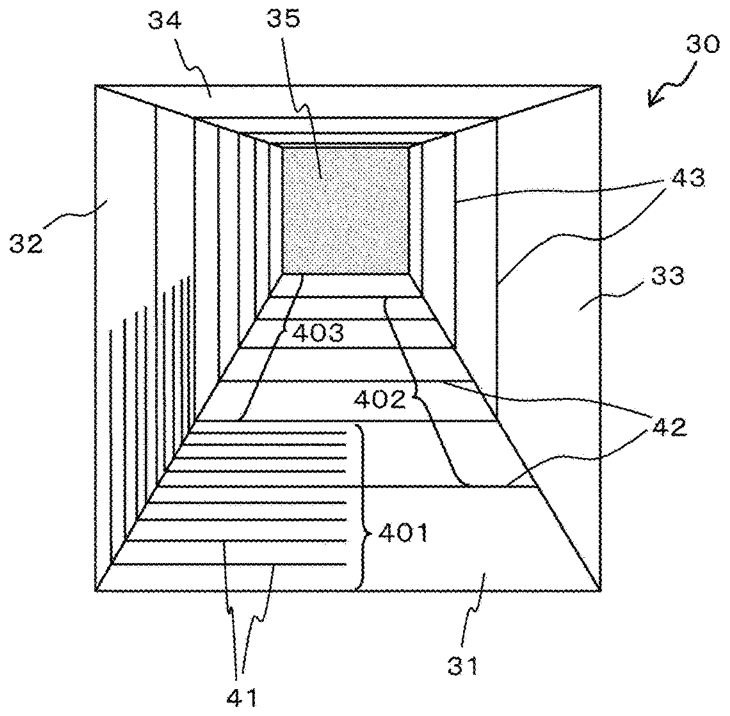
FIG. 3 is a diagram showing an example of an image of a three-dimensional space displayed by a space display unit of the present embodiment.

FIG. 3 is a diagram showing an example of an image of a three-dimensional space displayed by the space display unit 11. A three-dimensional space 30 shown in FIG. 3 is an example of a space having at least one plane extending in the depth direction. Here, there is shown the three-dimensional space 30 with a bottomed rectangular tube shape that includes five surfaces of a bottom surface 31, both side surfaces 32 and 33 rising from both ends of the bottom surface 31, a top surface 34 connecting the upper ends of both the side surfaces 32 and 33 to each other and facing the bottom surface 31, and an end surface 35 with a rectangular shape whose four sides are in contact with the four surfaces 31 to 34 at the end position of the time axis. Note that, the three-dimensional space 30 may be formed by a rectangular tube shape having the four surfaces 31 to 34 excluding the end surface 35.

Here, it is preferable that the three-dimensional space 30 has the end surface 35 disposed at a position offset in one direction from the center position of the image of the three-dimensional space 30 (not the center position of the three-dimensional space 30 but the center position of the rectangular shape of the image). In this manner, the distance between the end surface 35 and the outermost line of the image of the three-dimensional space 30 present in a direction opposite to the one direction increases. Therefore, since a region where scales 41 to 43 described below are assigned can be made wider, the visibility of the scales 41 to 43 can be improved.

In this three-dimensional space 30, the depth direction is the time axis, and the frontmost position indicates the current time and all positions further back indicate future times. The time at the position where the end surface 35 is located indicates a time corresponding to the farthest future time series information among the pieces of time series information stored in the time series information storage unit 20, that is, a time after time [T3×m] from the current time.

In addition, in the three-dimensional space 30, a plurality of different types of scales 41 to 43 for sizes of time units are assigned. The plurality of types of scales 41 to 43 correspond to time series information with different time units, respectively. In addition, each number of scales 41 to 43 corresponds to the number of pieces of time series information in different time units. The plurality of types of scales 41 to 43 are respectively assigned to ranges on the time axis corresponding to time zones in which the pieces of time series information with different time units are present. That is, on the time axis in the three-dimensional space 30, from a position corresponding to the start time where information begins to be present for each piece of time series information with different time units to a position corresponding to the end time where information is no longer present for each piece of time series information with different time units, the scales 41 to 43 are assigned along the time axis.

The first scale 41 with the shortest unit time is assigned corresponding to the time series information of the first time unit T1. From the frontmost position in the depth direction of the time axis in the three-dimensional space 30 (position on the time axis corresponding to the start time where the time series information of the first time unit T1 starts to be present) to a position on the time axis corresponding to the end time where the time series information of the first time unit T1 is no longer present, j scales are assigned within the range of the time zone indicated by reference numeral 401. In the example of FIG. 3, the first scale 41 is an L-shaped scale assigned to the region of the left half of the bottom surface 31 and the lower half of the left side surface 32. Note that, for a position overlapping the second scale 42 whose unit time is longer than the first scale 41 (fifth position from the frontmost position in the depth direction) and a position overlapping the third scale 43 (tenth position from the frontmost position in the depth direction), the first scale 41 may not be assigned. In this case, the number of first scales 41 is j−2.

In addition, the second scale 42 with the next shortest unit time is assigned corresponding to the time series information of the second time unit T2. From a position further back in the depth direction of the time axis in the three-dimensional space 30 than the start position of assigning the first scale 41 (position on the time axis corresponding to the start time where the time series information of the second time unit T2 starts to be present) to a position on the time axis corresponding to the end time where the time series information of the second time unit T2 is no longer present, k scales are assigned within the range of the time zone indicated by reference numeral 402. In the example of FIG. 3, the second scale 42 is an L-shaped scale assigned to a region from the left end to the right end of the bottom surface 31 and from the top end to the bottom end of the left side surface 32. Note that, for a position overlapping the third scale 42 whose unit time is longer than the second scale 42, the second scale 42 may not be assigned.

The third scale 43 with the longest unit time is assigned corresponding to the time series information of the third time unit T3. From a position further back in the depth direction of the time axis in the three-dimensional space 30 than the start position of assigning the second scale 42 (position on the time axis corresponding to the start time where the time series information of the third time unit T3 starts to be present) to a position on the time axis corresponding to the end time where the time series information of the third time unit T3 is no longer present (position of the end surface 35 of the rectangular tube), m scales are assigned within the range of the time zone indicated by reference numeral 403. In the example of FIG. 3, the third scale 43 is a rectangular scale that goes around the bottom surface 31, both the side surfaces 32 and 33, and the top surface 34.

The three-dimensional space 30 in FIG. 3 shows an example of a case where the number of pieces of time series information in the first time unit T1=6 minutes is j=10, the number of pieces of time series information in the second time unit T2=30 minutes is k=6, and the number of pieces of time series information in the third time unit T3=60 minutes is m=4, for example. In this case, for example, time series information of the first time unit T1 after time [T1×5] from the current time and time series information of the second time unit T2 after time [T2×1] from the current time are the same content. In addition, time series information of the first time unit T1 after time [T1×10] from the current time, time series information of the second time unit T2 after time [T2×2] from the current time, and time series information of the third time unit T3 after time [T3×1] from the current time are the same content.

The time series information display unit 12 displays, on the display 21, time series information in units of time corresponding to a time point designated by the time point designation unit 13 on the time axis of the three-dimensional space 30. For example, the time point designation unit 13 displays, on the time axis of the three-dimensional space 30 (for example, on the tangent between the bottom surface 31 and the left side surface 32 where all the first to third scales 41 to 43 are displayed), a pointer image that slides according to a mouse operation or a touch panel operation, and designates a time point indicated by the position of this pointer image. Note that, when the pointer image is stopped at a position between two adjacent scales, the time point designation unit 13 designates the time point of the scale located at the position closer to the stopped position. Alternatively, a user interface may be provided that allows the pointer image to be stopped only at a position overlapping the first to third scales 41 to 43.

For example, the time series information display unit 12 displays a time point designated on the time axis of the three-dimensional space 30 in an identifiable manner and displays a window in a region including the inside, outside, or both of the three-dimensional space 30, and displays time series information corresponding to the designated time point in the window.

Figure 4:
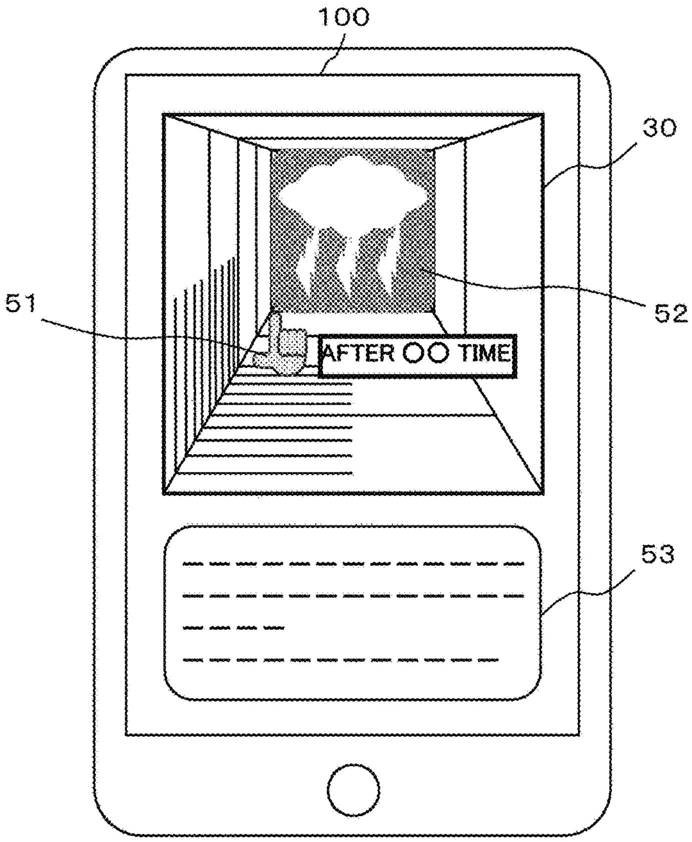
FIG. 4 is a diagram showing an example of a display form of time series information displayed by a time series information display unit of the present embodiment.

FIG. 4 is a diagram showing an example of a display form of time series information. In the example of FIG. 4, a state is shown in which an image of the three-dimensional space 30 is displayed on a display screen 100 of a mobile terminal, such as a smartphone, and any time point on the time axis of the three-dimensional space 30 is designated by a pointer image 51. In this case, for example, as shown in FIG. 4, the time series information display unit 12 displays a rectangular window whose sides are in contact with at least one plane at the position of the time point designated by the pointer image 51, and displays time series information in the window. Here, as an example, a rectangular window 52 whose four sides are in contact with the four sides 31 to 34 of a rectangular tube is displayed, and time series information is displayed in the window 52. In this case, by displaying the window 52 at the position of the time point designated by the pointer image 51, the time point designated on the time axis of the three-dimensional space 30 is displayed in an identifiable manner. Note that, although FIG. 4 shows a state in which time series information is displayed as a figure in the window 52, the time series information may be displayed in the form of text information or image information.

In the example of FIG. 4, an information display region 53 is provided in a region of the display screen 100 where the image of the three-dimensional space 30 is not displayed. Any information can be displayed in this information display region 53. For example, information related to the time series information displayed in the window 52 may be displayed in the information display region 53. As an example, when the time series information displayed in the window 52 is natural disaster information, it is conceivable to display information regarding evacuation, information regarding avoidance of secondary disasters, and the like in the information display region 53. The information displayed in the information display region 53 is stored, for example, in the time series information storage unit 20 or another storage medium in association with the time series information.

Note that, although FIG. 4 shows an example of displaying the rectangular window 52 whose four sides are in contact with the four sides 31 to 34 of the rectangular tube, the invention is not limited thereto. In other words, any window may be used as long as its sides are in contact with at least one of the four surfaces 31 to 34. For example, the rectangular window 52 smaller than the rectangular shape whose four sides are in contact with the four sides 31 to 34 of the rectangular tube may be displayed.

In addition, the rectangular window 52 larger than the rectangular shape whose four sides are in contact with the four sides 31 to 34 of the rectangular tube may be displayed. In this case, the window 52 may be displayed so as to be within the inner range of the three-dimensional space 30, or the window 52 may be displayed in a region spanning from the inside to the outside of the three-dimensional space 30.

In addition, the shape of the window 52 is not limited to a rectangular shape, and other shapes may be used. In addition, the number of windows 52 is not limited to one, but may be two or more.

Figure 5:
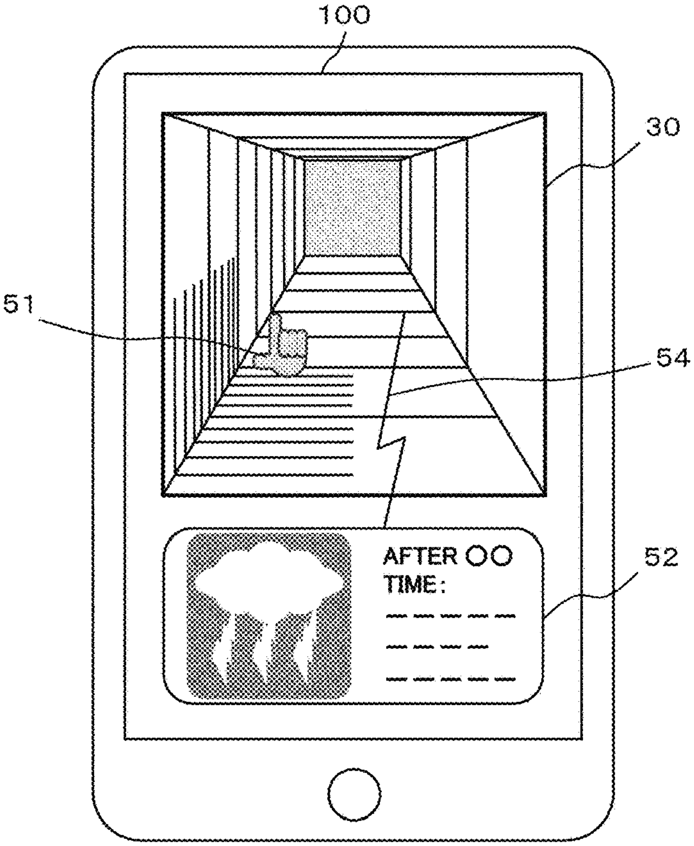
FIG. 5 is a diagram showing another example of the display form of the time series information displayed by the time series information display unit of the present embodiment.

In addition, although FIG. 4 shows an example in which the window 52 is displayed at the position of the time point designated by the pointer image 51 on the time axis of the three-dimensional space 30, the invention is not limited thereto. For example, as shown in FIG. 5, the window 52 may be displayed in a region outside the image of the three-dimensional space 30, and connection from the position of the time point designated by the pointer image 51 to the window 52 may be made by a leader line 54. In this case, the time point designated on the time axis of the three-dimensional space 30 is identifiably displayed by the leader line 54.

Figure 6:
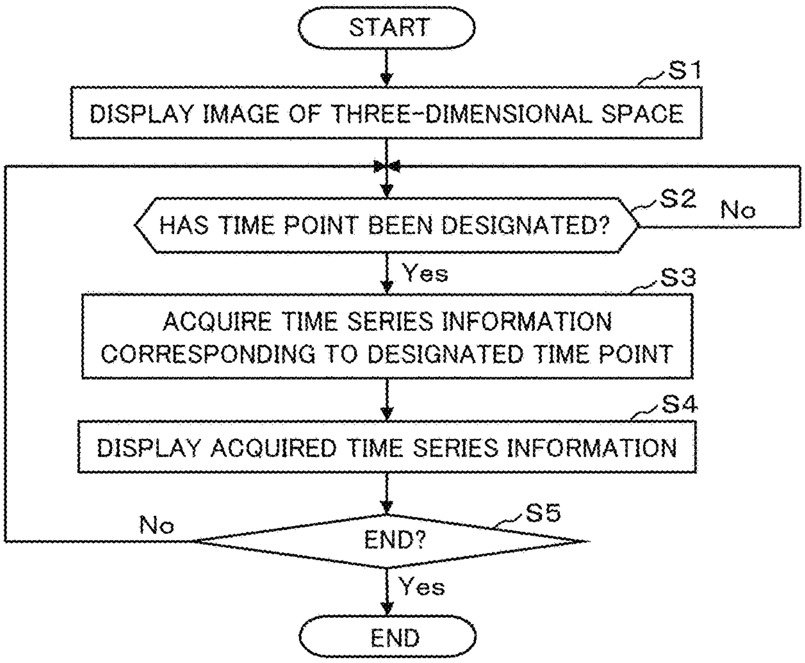
FIG. 6 is a flowchart showing an example of the operation of the time series information display device according to the present embodiment.

FIG. 6 is a flowchart showing an operation example of the time series information display device 10 according to the present embodiment configured as described above. The flowchart shown in FIG. 6 starts when a time series information display program is started.

When the time series information display program is started, first, the space display unit 11 displays, on the display screen 100, an image of the three-dimensional space 30 generated by assigning a plurality of different types of scales 41 to 43 for sizes of time units along the time axis (step S1). Then, the time point designation unit 13 determines whether any time point on the time axis of the three-dimensional space 30 has been designated by the position of the pointer image 51 (step S2). When any time point is not designated, the processing of step S2 is repeated.

On the other hand, when the time point designation unit 13 determines that any time point on the time axis has been designated, the time series information display unit 12 acquires, from the time series information storage unit 20, time series information in units of time corresponding to the designated time point (step S3). Then, the time series information display unit 12 displays the window 52 at a predetermined position on the display screen 100, and displays the time series information acquired from the time series information storage unit 20 in the window 52 (step S4).

Thereafter, the time series information display device 10 determines whether an operation to end the operation of the time series information display program has been performed (step S5). When the end operation is not performed, the process returns to step S2. On the other hand, when the end operation is performed, the process of the flowchart shown in FIG. 6 ends.

As described in detail above, in the present embodiment, the time axis is set in the depth direction using perspective, an image of the three-dimensional space 30 generated by assigning a plurality of different types of scales 41 to 43 for sizes of time units along the time axis is displayed, and time series information in units of time corresponding to the time point designated on the time axis of the three-dimensional space 30 is displayed. Here, the start positions of assigning a plurality of types of scales 41 to 43 to the time axis are set on the front side in the depth direction of the time axis for the scales of small time units, and are set at a position on the back side in the depth direction of the time axis for the scales of large time units.

According to the present embodiment configured as described above, it is possible to provide time series information without scrolling or switching the screen. In this case, it is possible to avoid a situation in which the intervals between the scales 41 to 43 become too small both on the front side and the back side of the time axis, resulting in poor visibility or poor designation operability. In addition, according to the present embodiment, since a plurality of different types of scales 41 to 43 for sizes of time units are assigned along the time axis, information can be provided in a state in which it is easy to intuitively understand which time unit of time series information is displayed when which position on the time axis is designated. As described above, according to the present embodiment, when providing time series information with different time units along the long time axis, it is possible to provide the time series information in an easy-to-understand manner while ensuring good visibility without scrolling or switching the screen.

First Modification Example

Note that, although an example in which the shape of the three-dimensional space 30 is fixed has been described in the present embodiment, the invention is not limited thereto. For example, the shape of the three-dimensional space 30 may be made transformable according to the user's operation. As an example, as shown in FIG. 7, the space display unit 11 may receive a user's operation to designate the position of the end surface 35 within the display range of the image of the three-dimensional space 30 and display an image of the three-dimensional space 30 that is a rectangular tube formed to have the end surface 35 at the designated position.

Figure 7:
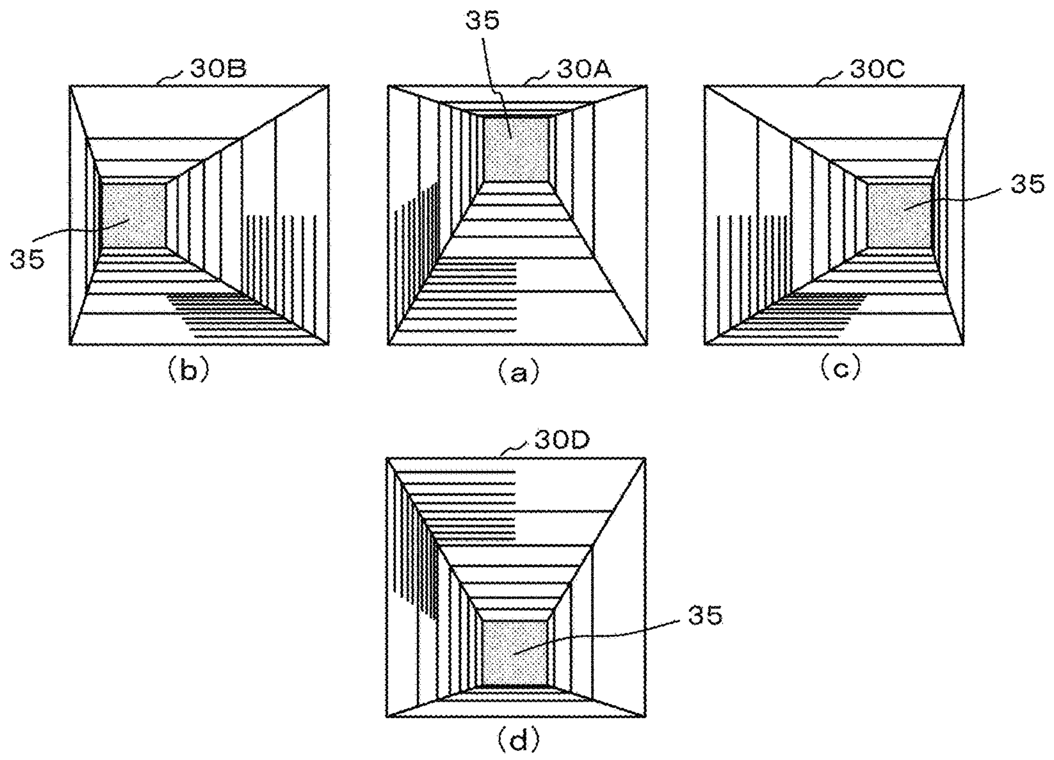
FIG. 7 is a diagram showing other examples of the image of the three-dimensional space displayed by the space display unit of the present embodiment.

For example, it is conceivable that in the initial state, an image of a three-dimensional space 30A (similar to the three-dimensional space 30 shown in FIG. 3) can be displayed as shown in FIG. 7(*a*) and then, according to the user's operation, images of three-dimensional spaces 30B to 30D having the end surface 35 at any of the positions shown in FIGS. 7(*b*) to 7(*d*) can be displayed. That is, any one of the images of the three-dimensional spaces 30A to 30D having the end surface 35 at any of the four positions shown in FIGS. 7(*a*) to 7(*d*) can be displayed according to the user's operation. The user's operation in this case is, for example, an operation such as dragging and dropping the end surface 35 using a mouse operation or a touch panel operation. Alternatively, the user's operation may be an operation of selecting either the top, bottom, left, or right on the menu screen.

Figure 8:
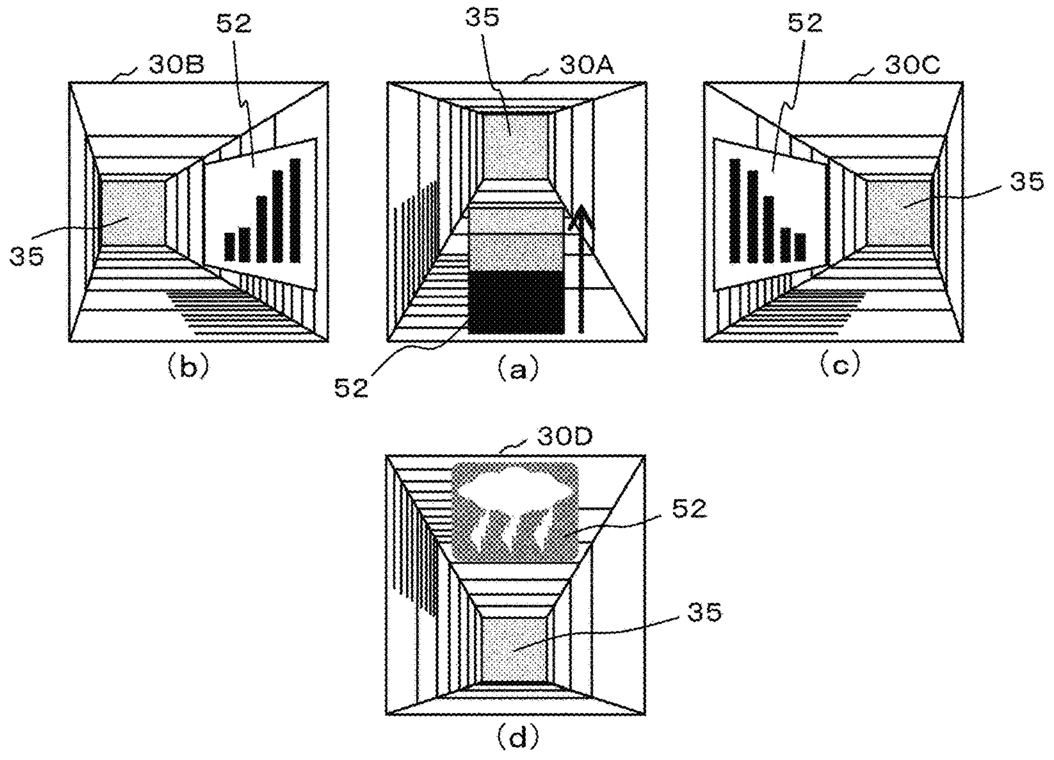
FIG. 8 is a diagram showing other examples of the display form of the time series information displayed by the time series information display unit of the present embodiment.

When the three-dimensional space 30 can be transformed by moving the end surface 35, the time series information display unit 12 may display the window 52 in a region where the end surface 35 is not present within the three-dimensional spaces 30A to 30D and display the time series information in the window 52. For example, as shown in FIG. 8, the window 52 is displayed in a range including a region (region forming one surface of the rectangular tube) between the end surface 35 disposed at a position unevenly distributed in one direction from the center position of each image of the three-dimensional spaces 30A to 30D and the outermost line of each image of the three-dimensional spaces 30A to 30D present in a direction opposite to the one direction, and the time series information is displayed in the window 52. For example, the window 52 is displayed on the side of the outermost line from the position of the time point designated by the user on the time axis of the three-dimensional space. The range "including" a region between the end surface 35 and the outermost line means that a front region beyond the outermost line may also be included. For example, when the position of the time point designated by the user is a position close to the outermost line, the range from the designated position of the time point to the outermost line becomes narrow. In this case, by displaying the window 52 in the range including the front region beyond the outermost line, the window 52 that is large enough to be able to see the time series information is ensured. Note that, the time series information may be displayed in the range including a region (region forming one surface of the rectangular tube) between the end surface 35 and the outermost line without displaying the window 52.

In this case, the time series information display unit 12 may change the type of time series information to be displayed in a region where the end surface 35 is not present, depending on the position where the end surface 35 is designated. For example, when displaying the three-dimensional space 30A where the end surface 35 is disposed at an upper position as shown in FIG. 8(*a*), the time series information displayed in a region below the end surface 35 is information related to events occurring near the ground, such as predicted information on soil precipitation. In addition, when displaying the three-dimensional spaces 30B and 30C where the end surface 35 is disposed at a left or right position as shown in FIG. 8(*b*) or 8(*c*), the time series information displayed in a region to the right or left of the end surface 35 is information related to water-related events, such as river water levels, high waves, and flood predicted information. In addition, when displaying the three-dimensional space 30D where the end surface 35 is disposed at a lower position as shown in FIG. 8(*d*), the time series information displayed in a region above the end surface 35 is information related to events occurring in the sky, such as predicted information on weather conditions.

In this manner, when the time series information in units of time corresponding to the designated time point includes a plurality of types of many pieces of information, the plurality of types of information can be displayed separately in different windows 52 displayed for each designated position of the end surface 35. Therefore, various types of information can be displayed larger and easier to understand compared to a case where a plurality of types of information are all displayed in one window 52.

In addition, by moving the end surface 35 to a desired position, the user can select and display only the type of information that the user desires. In this case, according to the designated position of the end surface 35, a correlation can be established between the type of information to be displayed and the display position, for example, information related to events occurring in the sky can be displayed in a region above the end surface 35 and information related to events occurring near the ground can be displayed in a region below the end surface 35. As a result, the user can intuitively understand what type of information will be displayed when the end surface 35 is moved to a certain position.

Note that, the method of setting the window 52 as shown in FIG. 8 may be applied when the position of the end surface 35 is fixed to the position shown in FIG. 3.

Second Modification Example

In addition, when the time series information includes information related to orientation, the time series information display unit 12 may display orientation information indicating which direction on the display screen 100 is which orientation, and may display a figure corresponding to the information related to the orientation of the time series information in accordance with the orientation information. The information related to orientation is, for example, information such as wind direction and the direction of travel of a typhoon or a linear rain band. The figure corresponding to the information related to orientation is, for example, an arrow. In addition, a figure showing time series information (for example, a cloud figure in the case of wind direction) may be used as a figure corresponding to the information related to orientation, and an animation display may be performed in which the figure is moved in the direction indicating orientation.

Figure 9:
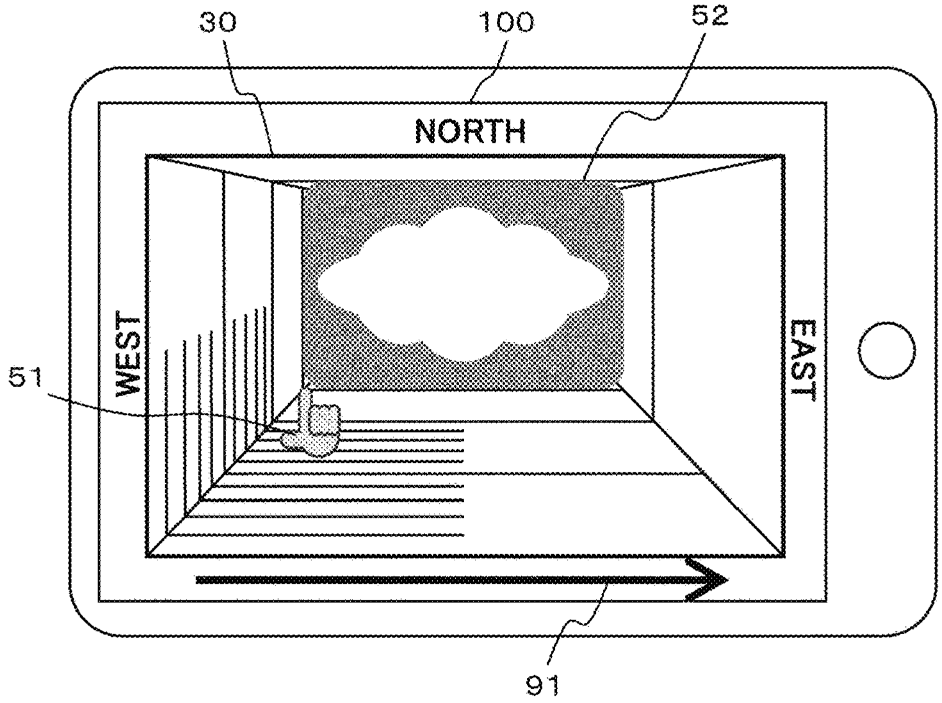
FIG. 9 is a diagram showing an example when displaying the orientation information together with time series information.

FIG. 9 is a diagram showing an example of the display screen 100 including information related to orientation. In FIG. 9, an image of the three-dimensional space 30 is displayed in almost the entire region of the display screen 100, leaving margins in the upper, lower, left, and right peripheral regions, and azimuth information of north, south, east, and west is displayed in the margins in three directions excluding the bottom side. In addition, an arrow 91 is displayed in the margin on the lower side as a figure corresponding to information related to the orientation of the time series information. This arrow 91 is an arrow pointing from west to east. For example, when the time series information includes information related to wind direction, this indicates that the wind is from the west.

In the present embodiment, since the time axis is not set on either the horizontal axis or the vertical axis of the two-dimensional space but the time axis is set in the depth direction of the three-dimensional space 30, there is no need to worry about giving the user the misunderstanding that the arrow 91 displayed in the horizontal direction as shown in FIG. 9 means the passage of time. Therefore, it is possible to provide the user with orientation information together with time series information in an easy-to-understand manner.

Note that, for the orientation information of north, south, east, and west displayed on the display screen 100, the same orientation information may be displayed at a fixed position. When the time series information display device 10 is mounted in a mobile terminal such as a smartphone or a tablet, the orientation information of north, south, east, and west displayed on the display screen 100 may be changed dynamically in accordance with the orientation detected by an orientation sensor provided in the mobile terminal. In the former case, the orientation information of north, south, east, and west is displayed so that the upper margin of the display screen 100 always displays "north". In the latter case, the orientation information of north, south, east, and west is displayed so that the information of the orientation detected by the orientation sensor is placed in the upper margin of the display screen 100.

Figure 10:
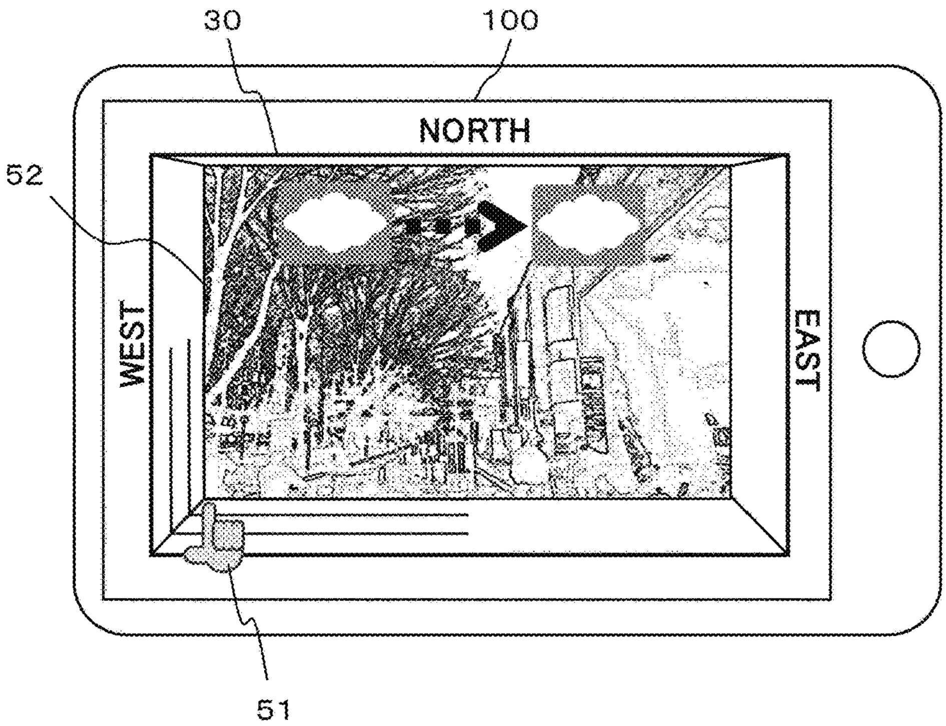
FIG. 10 is a diagram showing another example of the display form of the time series information displayed by the time series information display unit of the present embodiment.

When the time series information display device 10 is mounted in a mobile terminal, as shown in FIG. 10, the time series information display unit 12 may display the time series information using a cross-reality image (hereinafter, referred to as an XR image) including the surrounding environment at a location where the mobile terminal is present. Here, the time series information display unit 12 displays time series information regarding an area of a predetermined range including the location where the mobile terminal is present using an XR image. FIG. 10 shows an example in which an augmented reality image (AR image) including a surrounding image captured by a camera provided in a mobile terminal and time series information (in the example of FIG. 10, an animation display in which a figure showing time series information gradually moves in a direction indicating the orientation) is displayed in the window 52.

Third Modification Example

In the second modification example, as shown in FIG. 10, an example has been described in which when time series information includes information related to orientation, the time series information including the information related to the orientation is displayed in the window 52 using an AR image. On the other hand, even when the time series information does not include information related to orientation, the time series information may be displayed using an AR image. That is, an AR image including time series information may be displayed in the window 52 shown in FIG. 4, 5, or 8. In addition, instead of the AR image, a virtual reality image (VR image) or a mixed reality image (MR image) may be displayed. This also applies to the second modification example.

Figure 11:
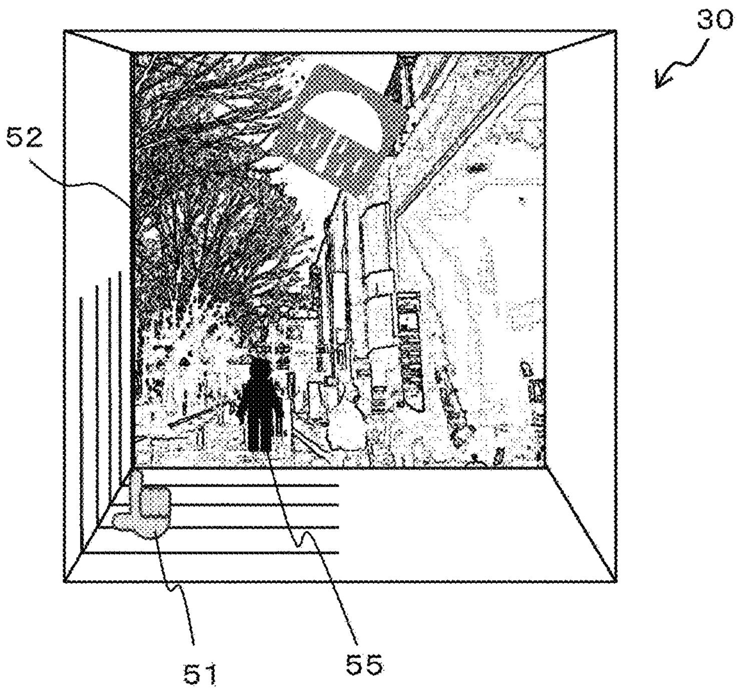
FIG. 11 is a diagram showing another example of the display form of the time series information displayed by the time series information display unit of the present embodiment.

In addition, as shown in FIG. 11, the time series information display unit 12 may display an XR image including a user's avatar 55. When the time series information is weather information or natural disaster information, the time series information can be said to be information regarding a phenomenon that occurs in the surrounding environment at a location where the mobile terminal is present. When displaying an XR image including the user's avatar 55, the avatar 55 expressing a state affected by the phenomenon indicated by the time series information may be displayed. For example, when the time series information indicates rainfall as shown in FIG. 11, the avatar 55 wet in the rain is displayed.

Figure 12:
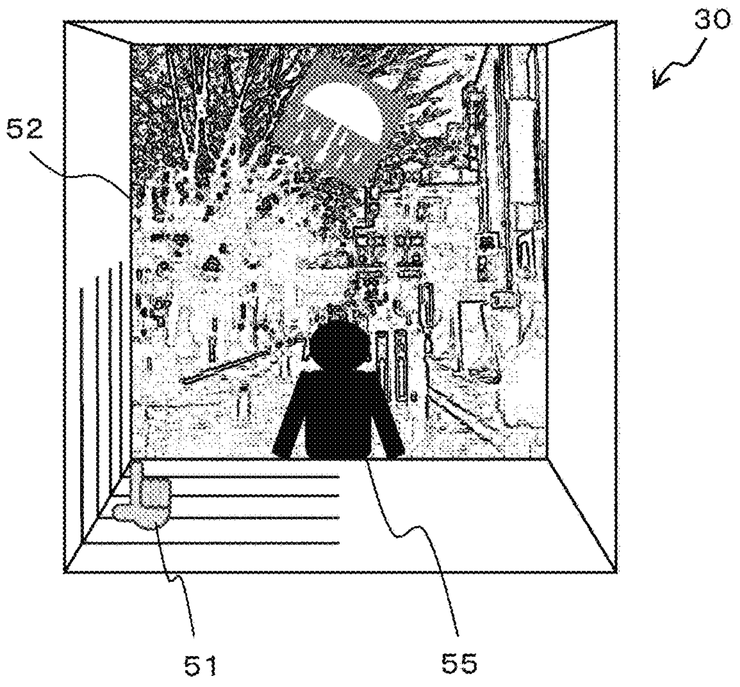
FIG. 12 is a diagram showing another example of the display form of the time series information displayed by the time series information display unit of the present embodiment.

In this manner, it is possible to visualize, through the display of the avatar 55, how the user appears to be affected by a phenomenon occurring in the surrounding environment at the time point designated by the user on the time axis. Note that, as shown in FIG. 12, the image of the surrounding environment may be made zoomable as desired according to the user's operation, and the position or size of the avatar 55 may be changed accordingly for display.

Fourth Modification Example

When displaying an X-ray image, the time series information display unit 12 may display the time series information as follows. That is, as shown in FIG. 13, when any time point is not designated on the time axis of the three-dimensional space, the time series information display unit 12 sets a plurality of windows $52_{-1}$, $52_{-2}$, . . . , $52_{-n}$ at positions of a plurality of time points, and displays a plurality of pieces of time series information corresponding to the plurality of time points in each of the windows $52_{-1}$, $52_{-2}$, . . . , $52_{-n}$ using an XR image whose transparency is set to be more than 0% and less than 100%.

Figure 13:
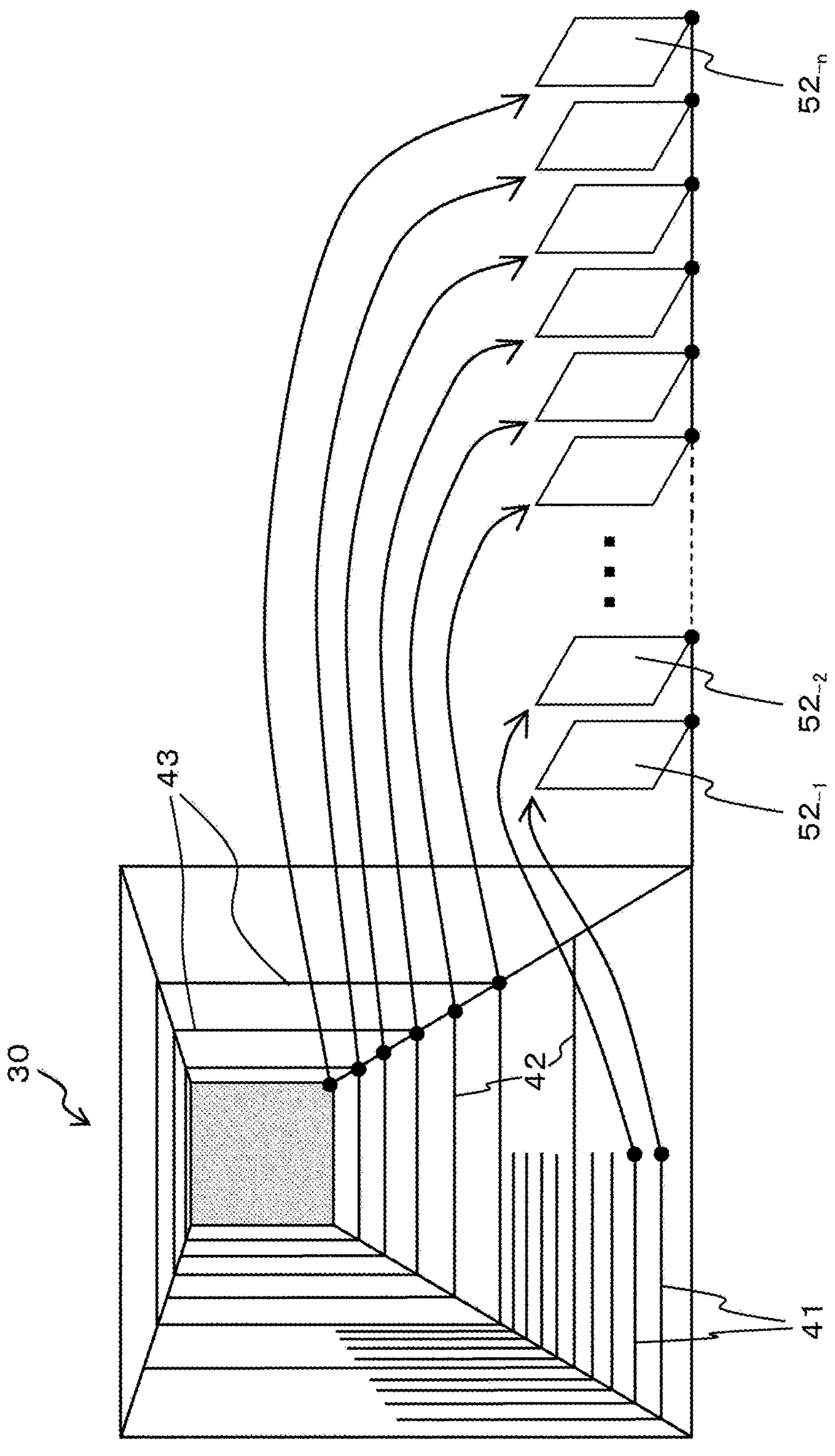
FIG. 13 is a diagram showing another example of the display form of the time series information displayed by the time series information display unit of the present embodiment.

In FIG. 13, the windows $52_{-1}$, $52_{-2}$, . . . , $52_{-n}$ are set for each of all the scales 41 to 43 set in the three-dimensional space 30. Note that, a plurality of windows 52 may be set for some of the scales. For example, one window $52_{-1}$, one window $52_{-2}$, and one window $52_{-3}$ may be set for each of the first scale 41, the second scale 42, and the third scale 43.

The transparency of the XR image displayed in each of the windows $52_{-1}$, $52_{-2}$, . . . , $52_{-n}$, is set such that the XR image can be seen through from the frontmost window $52_{-1}$ to the deepest window $52_{-n}$. In this manner, a plurality of pieces of time series information corresponding to a plurality of time points can be understood to some extent even before the user designates any time point.

Thereafter, when the user designates any time point on the time axis in the three-dimensional space, the time series information display unit 12 removes the display of the window 52 in front of the position of the designated time point. For example, when the fifth time point from the front is designated on the time axis, the time series information display unit 12 removes the displays of the first to fourth windows $52_{-1}$ to $52_{-4}$. In this manner, an XR image of the window $52_{-5}$ corresponding to the position of the designated time point can be displayed clearly.

At this time, the transparency of the XR image of the window $52_{-5}$ may be changed to 0%. Then, since the XR images of the windows $52_{-6}$ to $52_{-n}$ located further back than the designated time point are not seen through, the XR image of the window $52_{-5}$ corresponding to the position at the designated time point can be displayed more clearly and more easily visually recognizably.

Note that, instead of removing the display of the window in front of the position of the designated time point, the transparency of the XR image of the window in front of the position of the designated time point may be set to 100%. In addition to the windows in front of the position at the designated time point, the display of windows behind the position at the designated time point may also be erased, or the transparency of the XR image may be set to 100%.

Fifth Modification Example

When the time series information display device 10 is mounted in a mobile terminal, the time series information display unit 12 may selectively display time series information regarding a current area of a predetermined range including a location where the mobile terminal is present and time series information regarding a surrounding area of a predetermined range around the current area based on the user's operation. The fifth modification example can also be applied to any of the embodiments and the first to fourth modification examples. The fifth modification example is particularly useful when displaying time series information using XR images.

Figure 14:
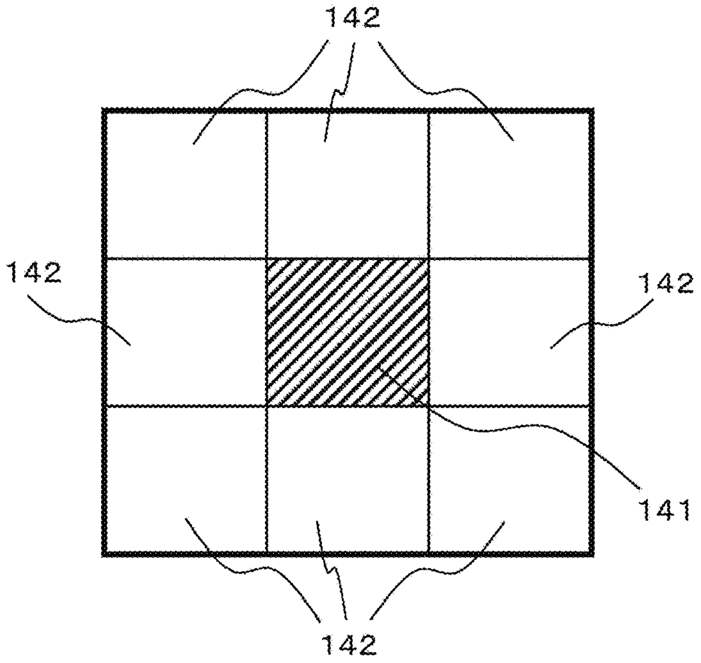
FIG. 14 is a diagram showing an example of a current area and surrounding areas.

FIG. 14 is a diagram showing an example of a current area and surrounding areas. In FIG. 14, a diagonally shaded rectangular region is a current area 141 of a predetermined range including a position where a mobile terminal is present. The rectangular region of the predetermined range is, for example, a mesh region of 250 meters square. In FIG. 14, eight rectangular regions that are not diagonally shaded are the surrounding areas 142, which are set in a plurality of directions around the current area 141.

In the example of FIG. 14, it is possible to selectively display time series information of nine areas in total, including the current area 141 and eight surrounding areas 142 around the current area 141. The selection method of which area's time series information is to be displayed is arbitrary. For example, according to a predetermined operation by the user, either the current area 141 or the surrounding area 142 is selected, and one of eight directions is further selected when the surrounding area 142 is selected.

As an example of the method for selecting either the current area 141 or the surrounding area 142, it is possible to make a selection according to the direction in which the mobile terminal is tilted, using a detection value from an acceleration sensor provided in the mobile terminal. For example, the current area 141 is selected when it is detected that the top side of the display screen 100 of the mobile terminal is tilted toward the ground, and the surrounding area 142 is selected when it is detected that the top side is tilted toward the sky.

Figure 15:
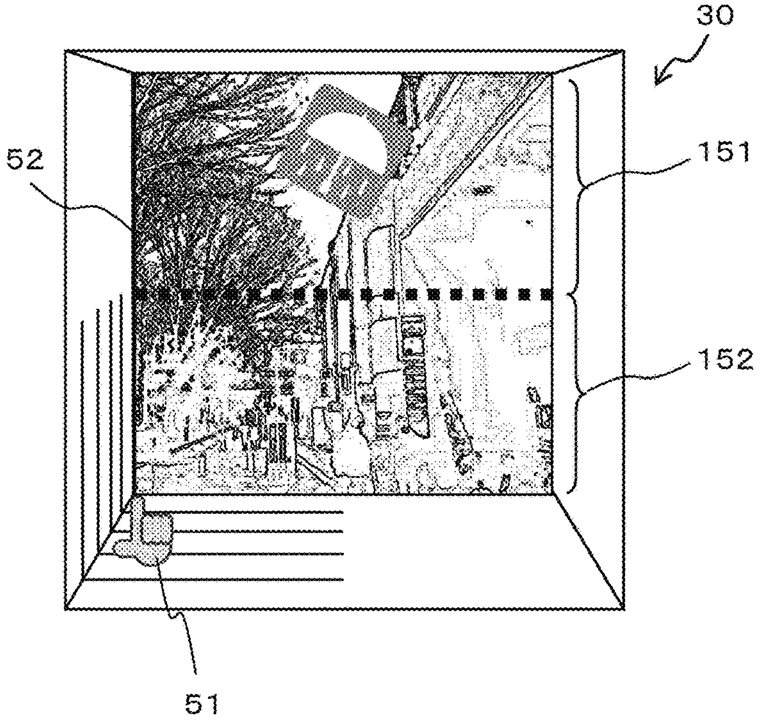
FIG. 15 is a diagram showing an example of a method for selecting a current area or a surrounding area.

As another method, as shown in FIG. 15, an upper region 151 (region on the far side) and a lower region 152 (region on the near side) may be set in the window 52 in which an XR image is displayed, and the surrounding area 142 may be selected when it is detected that the upper region 151 has been touched and the current area 141 may be selected when it is detected that the lower region 152 has been touched.

In addition, as an example of the method for selecting one of the surrounding areas 142 in eight directions, it is possible to select the surrounding area of the orientation detected by an orientation sensor provided in the mobile terminal (direction in which the mobile terminal is facing). As another method, a user interface that allows selection of any of the eight directions may be displayed on the display screen 100, and the surrounding area 142 in any direction may be selected by operating the user interface.

Note that, the invention is not limited to a method in which the selection of either the current area 141 or the surrounding area 142 and the selection of the direction of the surrounding area 142 are performed separately. For example, a user interface that allows selection of one of nine areas may be displayed on the display screen 100, and one of the areas may be selected by operating the user interface.

Sixth Modification Example

In the embodiments, as shown in FIG. 3, an example has been described in which there is an overlapping range between the range 401 to which the first scale 41 is assigned and the range 402 to which the second scale 42 is assigned and there is an overlapping range between the range 402 to which the second scale 42 is assigned and the range 403 to which the third scale 43 is assigned, but the invention is not limited thereto. For example, as shown in FIG. 16, a plurality of types of scales 41 to 43 may be separately assigned to a plurality of non-overlapping ranges 401' to 403' in such a manner that the first scale 41 corresponding to the shortest time unit is assigned to the frontmost range 401' in the depth direction and the third scale 43 corresponding to the longest time unit is assigned to the deepest range 403' in the depth direction.

Figure 17:
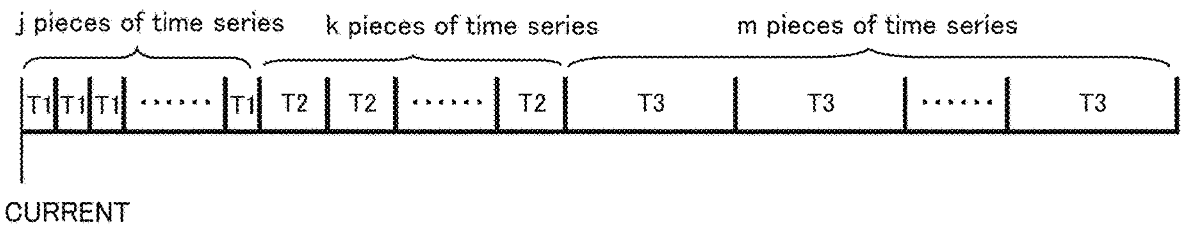
FIG. 17 is a diagram showing another example of time series information.

The sixth modification example is suitable for use when the time series information stored in the time series information storage unit 20 is configured as shown in FIG. 17. In an example shown in FIG. 17, the time series information storage unit 20 stores, as time series information, predicted information after time (T1×1) from the current time, predicted information after time (T1×2) from the current time, . . . predicted information after time (T1×j+T2×1) from the current time, predicted information after time (T1×j+T2×2) from the current time, . . . predicted information after time (T1×j+T2×k+T3×1) from the current time, . . . predicted information after time (T1×j+T2×k+T3×m) from the current time.

When displaying the image of the three-dimensional space 30 shown in FIG. 3 corresponding to the time series information shown in FIG. 2, it is necessary to make scale sizes of the three types of scales 41 to 43 the same to unify the standards. This is because there is an overlapping region in the range 401 to 403 where the three types of scales 41 to 43 are displayed. On the other hand, when displaying an image of a three-dimensional space 30' shown in FIG. 16 corresponding to the time series information shown in FIG. 17, it is not necessary to make scale sizes of the three types of scales 41 to 43 the same to unify the standards.

Figure 16:
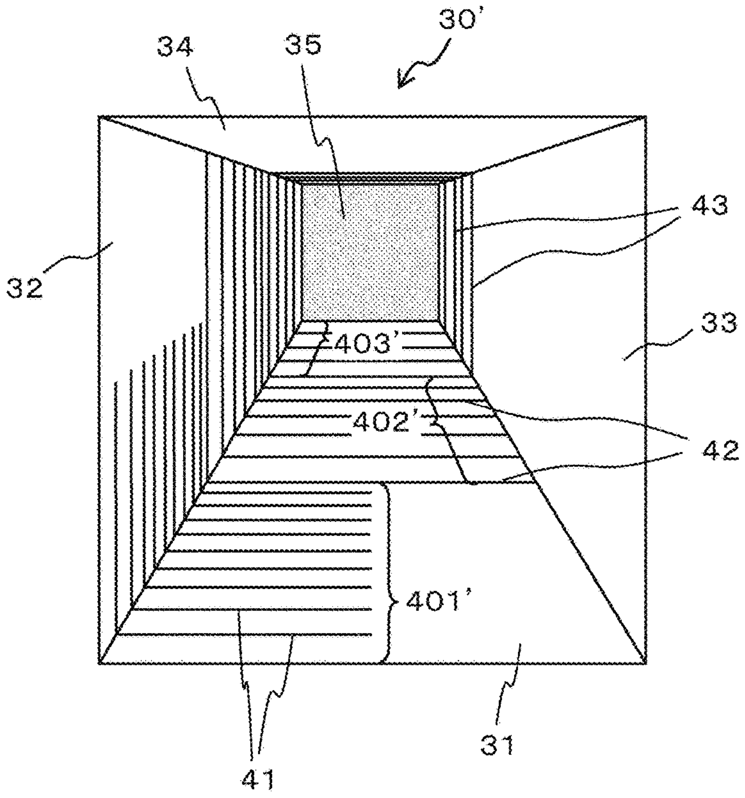
FIG. 16 is a diagram showing another example of the image of the three-dimensional space displayed by the space display unit.

In this manner, as shown in FIG. 16, it is possible to adjust the scales 42 and 43 displayed in the ranges 402' and 403' on the back side of the three-dimensional space 30' to scale sizes that are easy to see. Therefore, even when providing time series information with different time units along a fairly long time axis, the scales 42 and 43 arranged in the ranges 402' and 403' at the back of the time axis can be displayed so that these are easily visually recognized and easily designated.

OTHER MODIFICATION EXAMPLES

In the embodiments, an example has been described in which the three-dimensional space 30 has a rectangular tube shape, but the invention is not limited thereto. For example, a shape without the top surface 34 may be adopted. Alternatively, a shape without the top surface 34 and either the left side surface 32 or the right side surface 33 may be adopted. Alternatively, a shape with only one of the bottom surface 31, the left side surface 32, and the right side surface 33 may be adopted. In addition, a cylindrical shape may be adopted.

In addition, in the embodiments, an example has been described in which predicted information from the present to the future is displayed as an example of time series information, but the invention is not limited thereto. For example, time series information from the present to the past may be displayed backwards. In addition, time series information from the past to the future may be displayed.

In addition, in the embodiments, weather information or natural disaster information has been mentioned as an example of the time series information, but the information is not limited thereto. For example, the time series information may be disaster prevention information (time series countermeasure information) for natural disasters. Although the information regarding evacuation, the information regarding avoidance of secondary disasters, and the like are displayed in the information display region 53 in FIG. 4, these pieces of information may also be displayed in the window 52 as time series information.

In addition, all of the embodiments are merely examples for implementing the invention, and these should not be interpreted as limiting the technical scope of the invention. That is, the invention can be implemented in various forms without departing from the gist or main features thereof.

REFERENCE SIGNS LIST

10: time series information display device
11: space display unit
12: time series information display unit
13: time point designation unit
30, 30': image of three-dimensional space
41: first scale
42: second scale
43: third scale
51: pointer image
52: window
55: avatar

The invention claimed is:

1. A time series information display device that displays time series information along a time axis on a display screen having an image of a three-dimensional space with the time axis represented in a depth direction using perspective, the three-dimensional space having a plane that extends while converging toward the depth direction, wherein the time series information includes a plurality of time series information each having different unit times, and each of the plurality of time series information is updated every time a current time passes by a corresponding unit time, the time series information display device comprising:

a space display unit that displays the image of the three-dimensional space, the image generated by assigning, on the plane, a plurality of different types of scales for sizes of the different unit times along the time axis; and a time series information display unit that displays the time series information in the different unit times corresponding to a time point of scale designated on the time axis of the three-dimensional space, and the space display unit displays the image of the three-dimensional space in which a start position of assigning the plurality of different types of scales for sizes of the different unit times to the time axis is set on a front side in the depth direction of the time axis for scales of small unit times and set at a position on a back side in the depth direction of the time axis for scales of large unit times.

2. The time series information display device according to claim 1, wherein each of the plurality of time series information having the different unit times is information which is present, on the time axis, in a specific time zone from respective start to end positions unique to that one of the plurality of time series information having the different unit times, and the space display unit displays the image of the three-dimensional space, which is generated by assigning, on the plane, the plurality of different types of scales for sizes of the different unit times along the time axis, in corresponding ranges on the time axis in which the plurality of time series information having the different unit times are present.

3. The time series information display device according to claim 2, wherein the space display unit displays the image of the three-dimensional space in which the plurality of different types of scales are separately assigned to a plurality of non-overlapping ranges in such a manner that a first scale of a first type corresponding to a shortest unit time is assigned to a frontmost range in the depth direction and a second scale of a second type corresponding to a longest unit time is assigned to a deepest range in the depth direction.

4. The time series information display device according to claim 1, wherein the position is a first position, and the time series information display unit displays a rectangular window with a side in contact with the plane at a second position of the time point of scale designated on the time axis of the three-dimensional space, and displays the time series information in the rectangular window.

5. The time series information display device according to claim 4, wherein the three-dimensional space is a space of a rectangular tube including five surfaces of a bottom surface, both side surfaces rising from both ends of the bottom surface, a top surface connecting upper ends of both the side surfaces to each other and facing the bottom surface, and an end surface with a rectangular shape whose four sides are in contact with four surfaces of the bottom surface, both the side surfaces, and the top surface at an end position of the time axis, and the time series information display unit displays a window having a rectangular shape whose four sides are in contact with the four surfaces of the bottom surface, both the side surfaces, and the top surface at the second position of the time point of scale designated on the time axis of the three-dimensional space, and displays the time series information in the window.

6. The time series information display device according to claim 1, wherein the position is a first position, the three-dimensional space is a space of a rectangular tube including five surfaces of a bottom surface, both side surfaces rising from both ends of the bottom surface, a top surface connecting upper ends of both the side surfaces to each other and facing the bottom surface, and an end surface with a rectangular shape whose four sides are in contact with four surfaces of the bottom surface, both the side surfaces, and the top surface at an end position of the time axis, and the time series information display unit displays the time series information in a range including a region where the end surface is not present in the three-dimensional space and which is located between the end surface disposed at a second position unevenly distributed in one direction from a center position of the image of the three-dimensional space and an outermost line of the image of the three-dimensional space present in a direction opposite to the one direction.

7. The time series information display device according to claim 6, wherein the space display unit receives a user's operation to designate a third position of the end surface within a display range of the image of the three-dimensional space and displays the image of the three-dimensional space that is the rectangular tube formed to have the end surface at the third position.

8. The time series information display device according to claim 7, wherein the time series information display unit changes a type of the time series information to be displayed in the region where the end surface is not present according to the third position where the end surface is designated.

9. The time series information display device according to claim 1, wherein, when the time series information includes information related to orientation of east, west, north, or south as a content thereof, the time series information display unit displays orientation information indicating which direction of right, left, up, or down on the display screen is which orientation of east, west, north, or south, and displays a figure corresponding to the information related to the orientation of the time series information in accordance with the orientation information.

10. The time series information display device according to claim 1, wherein the time series information display device is mounted in a mobile terminal, and the time series information display unit displays the time series information using a cross-reality image including a surrounding environment at a location where the mobile terminal is located.

11. The time series information display device according to claim 10, wherein the time series information is information regarding a phenomenon that occurs in the surrounding environment at the location where the mobile terminal is present, and the time series information display unit displays the cross-reality image including a user's avatar, and displays an avatar expressing a state affected by the phenomenon indicated by the time series information.

12. The time series information display device according to claim 10, wherein the position is a first position, when any time point is not designated on the time axis of the three-dimensional space, the time series information display unit sets a plurality of windows at positions of a plurality of time points, and displays a plurality of pieces of time series information corresponding to the plurality of time points in each window using a first corresponding cross-reality image whose transparency is set to be more than 0% and less than 100%, and when any time point is designated on the time axis of the three-dimensional space, the time series information display unit removes display of a window in front of a second position of the designated time point or sets a transparency of a second corresponding cross-reality image of the window in front of the second position of the designated time point to 100%.

13. The time series information display device according to claim 1, wherein the time series information display device is mounted in a mobile terminal, and the time series information display unit selectively displays a first portion of the time series information regarding a current area of a first predetermined range including a location where the mobile terminal is present and a second portion of the time series information regarding a surrounding area of a second predetermined range around the current area based on a user's operation.

14. The time series information display device according to claim 13, wherein, when displaying the second portion of the time series information regarding the surrounding area, the time series information display unit selectively displays the second portion of the time series information regarding the surrounding area in a direction in which the mobile terminal is facing, which is detected by the mobile terminal.

15. A time series information display method for displaying, along a time axis, a plurality of time series information on a display screen having an image of a three-dimensional space with the time axis represented in a depth direction using perspective, the three-dimensional space have a plane that extends while converging toward the depth direction represented, the plurality of time series information each having different unit times and each updated every time a current time passes by a corresponding unit time, the time series information display method comprising:

displaying, with a space display unit of a time series information display device, the image of the three-dimensional space, which is generated by assigning, on the plane, a plurality of different types of scales for sizes of the different unit times along the time axis and in which a start position of assigning the plurality of different types of scales for sizes of the different unit times to the time axis is set on a front side in the depth direction of the time axis for scales of small unit times and set at a position on a back side in the depth direction of the time axis for scales of large unit times; and displaying, with a time series information display unit of the time series information display device, the time series information in the different unit times corresponding to a time point of scale designated on the time axis of the three-dimensional space.

16. The time series information display device according to claim 2, wherein the position is a first position, and the time series information display unit displays a rectangular window with a side in contact with the plane at a second position of the time point of scale designated on the time axis of the three-dimensional space, and displays the time series information in the rectangular window.

17. The time series information display device according to claim 2, wherein, when the time series information includes information related to orientation of east, west, north, or south as a content thereof, the time series information display unit displays orientation information indicating which direction of right, left, up, or down on the display screen is which orientation of east, west, north, or south, and displays a figure corresponding to the information related to the orientation of the time series information in accordance with the orientation information.

18. The time series information display device according to claim 2, wherein the time series information display device is mounted in a mobile terminal, and the time series information display unit selectively displays a first portion of the time series information regarding a current area of a first predetermined range including a location where the mobile terminal is present and a second portion of the time series information regarding a surrounding area of a second predetermined range around the current area based on a user's operation.

* * * * *